(12) United States Patent
Gokan et al.

(10) Patent No.: US 6,634,420 B2
(45) Date of Patent: Oct. 21, 2003

(54) INTERCOOLER

(75) Inventors: Yoshitsugu Gokan, Wako (JP); Fujio Umebayashi, Wako (JP); Kazuhiko Tomoda, Wako (JP); Kenji Okubo, Wako (JP); Kouichi Takeshita, Konan (JP); Kazuhiro Yamashita, Konan (JP); Naoto Hayashi, Konan (JP); Yoshihisa Eto, Konan (JP)

(73) Assignees: Honda Giken Kogyo Kabushiki Kaisha, Tokyo (JP); Zexel Valeo Climate Control Corporation, Saitama (JP)

( * ) Notice: Subject to any disclaimer, the term of this patent is extended or adjusted under 35 U.S.C. 154(b) by 0 days.

(21) Appl. No.: 10/118,229

(22) Filed: Apr. 9, 2002

(65) Prior Publication Data

US 2002/0144806 A1 Oct. 10, 2002

(30) Foreign Application Priority Data

Apr. 10, 2001 (JP) ........................ 2001-111254

(51) Int. Cl.$^7$ ................................. F28D 7/10
(52) U.S. Cl. ................. 165/157; 165/51; 165/83; 60/599; 123/563
(58) Field of Search ................. 165/154, 157, 165/51, 83; 60/599; 123/563

(56) References Cited

U.S. PATENT DOCUMENTS

| 2,451,132 | A | * | 10/1948 | Vincent | 165/157 |
| 4,191,148 | A | * | 3/1980 | Patel et al. | 123/119 |
| 4,269,158 | A | * | 5/1981 | Berti | 123/563 |
| 4,415,024 | A | * | 11/1983 | Baker | 165/160 |
| 4,436,145 | A | * | 3/1984 | Manfredo et al. | 165/67 |
| 4,562,697 | A | * | 1/1986 | Lawson | 60/599 |
| 4,635,712 | A | * | 1/1987 | Baker et al. | 165/82 |

* cited by examiner

*Primary Examiner*—Henry Bennett
*Assistant Examiner*—Terrell L McKinnon
(74) *Attorney, Agent, or Firm*—Wenderoth, Lind & Ponack, L.L.P.

(57) ABSTRACT

In order to provide an intercooler assuming a simple structure that enables cooling of supercharging air and absorption of any expansion/contraction of the cooling water pipe and the casing attributable to the heat of the supercharging air, intake/outlet pipes of a heat exchanger housed inside a cooling space formed within a case are inserted at cylindrical pipe insertion portions formed at the case, and any gap present between the intake/outlet pipes and the insertion portions are sealed by seal members each constituted of an elastic material formed in a staged cylindrical shape having a first cylindrical portion placed in complete contact with one of the pipe insertion portions and a second cylindrical portion placed in complete contact with either one of the intake/outlet pipes, which are also utilized to fit the heat exchanger in the case with a gap.

20 Claims, 7 Drawing Sheets

INTERCOOLER

BACKGROUND OF THE INVENTION

The present invention relates to an intercooler for a supercharger that provides supercharging air to a 4-cycle engine mounted in a small planing boat such as a motorboat or a recreational watercraft.

A small planing boat, which is often operated with the throttle wide open or in an idling state, unlike an automobile, is conventionally mounted with a 2-cycle engine in consideration of the acceleration of the engine and the like, as disclosed in Japanese Unexamined Patent Publication No. H 10-258794. However, a small planing boat must be mounted with a 4-cycle engine in order to increase its cruising distance and to achieve reduced engine vibration, and it is essential to install a supercharger in order to improve the engine air intake rate when mounting the small planing boat with a 4-cycle engine.

When a supercharger is utilized, the temperature of the supercharging air output from the supercharger rises to approximately 120° C.~130° C. due to the temperature increase caused during the compression at the compressor and the heat transmitted from the exhaust gas on the turbine side, and if the supercharging air is directly supplied to the cylinder, knocking will occur readily and only a small improvement in output can be achieved due to the lowered air density. Accordingly, a water-cooled intercooler such as that disclosed in Japanese Unexamined Patent Publication No. H 4-32694 or Japanese Unexamined Patent Publication No. H 4-208391 is provided to increase the air density by cooling the supercharging air for higher supercharger efficiency.

However, there is a problem with these intercoolers in that since the cooling water pipeline undergoes repeated expansion/contraction as the temperature of the intake air changes, the area over which the cooling water pipeline is connected with the casing is subjected to considerable stress, resulting in distortion occurring in the area, which, in turn, will cause cracks readily.

Accordingly, in the intercooler disclosed in Japanese Unexamined Utility Model Publication No. H 5-57318, an assembly constituted by securing the leading end and trailing end of the pipeline through which a fluid used to cool the intake air flows, to a supporting member and folding back the middle portion of the pipeline is housed in the casing with a gap between the folded portion and the casing so as to absorb the expansion/contraction of the cooling water pipeline at the gap.

However, the intercooler disclosed in Japanese Unexamined Utility Model Publication No. H 5-57318 poses a problem in that the cooling water pipeline, which is folded back, cannot have a large diameter and thus, the flow passage resistance at the pipe is bound to be high. In addition, if the pipe is folded back at the exact halfway point to form two half portions having flow path lengths equal to each other, the ease of pipe installation is compromised and more wasted space is created, whereas if the pipe is folded back to form two portions with different flow path lengths for ease of installation, the temperature distribution over the cooling area becomes inconsistent, resulting in a lower heat exchanging rate.

SUMMARY OF THE INVENTION

Accordingly, an object of the present invention is to provide an intercooler assuming a simple structure, that is capable of cooling supercharging air and absorbing expansion/contraction of the cooling water pipe and the casing caused by the heat of the supercharging air.

In order to achieve the object described above, in the intercooler according to the present invention comprising a heat exchanger constituted of at least a pair of tanks, a plurality of tubes communicating between the pair of tanks, a plurality of fins provided along the tubes over specific intervals and cylindrical intake/outlet pipes each communicating with one of the tanks and extending outward from the tank and a case defining a cooling space in which the heat exchanger is housed and through which supercharging air passes, a pair of cylindrical pipe insertion portions at each of which one of the intake/outlet pipes is inserted and is allowed to extend to the outside are formed at the case, and seal members each provided at one of the pipe insertion portions, constituted of an elastic material formed in a staged cylindrical shape that includes a first cylindrical portion placed in complete contact with the external circumferential surface of the respective pipe insertion portion and a second cylindrical portion placed in complete contact with the external circumferential surface of the intake/outlet pipe, seal the gaps between the intake/outlet pipes and the pipe insertion portions and are also utilized to fit the heat exchanger in the case with a gap.

Since the intake/outlet pipes of the heat exchanger housed inside the cooling space formed inside the case are inserted at the cylindrical pipe insertion portions formed at the case and the seal members each constituted of an elastic material formed in a staged cylindrical shape having the first cylindrical portion placed in complete contact with the pipe insertion portions and the second cylindrical portion placed in complete contact with the intake/outlet pipe seal the gap between the intake/outlet pipes and the insertion portions and fit the heat exchanger at the case with a gap as described above, the expansion/contraction of the heat exchanger and the case induced by heat can be absorbed at the seal members, and thus, the object described above is achieved.

In addition, it is desirable that the first cylindrical portion and the second cylindrical portion of each seal member be secured to the pipe insertion portion or the intake/outlet pipes by a ring clamp, so as to improve the seal and security of the seal members themselves.

It is also desirable that the intake/outlet pipes extend from the tanks to the outside along the direction in which the axis of the tubes extends and that the case can be divided along the axial direction. These structural features facilitate the process of mounting the heat exchanger in the case.

Furthermore, it is desirable that a buffer member constituted of an elastic material be provided between each tank of the heat exchanger and the inner surface of the case and that the buffer member include a side surface buffer member provided between the side surface of the tank and the inner surface of the case and an end surface buffer member provided between the end surface of the tank, i.e., one of the two tank ends set at the two ends along the direction in which the intake/outlet pipes extend and the inner surface of the case. Since the side surface buffer members provided between the side surfaces of the tank and the inner surface of the case secure the heat exchanger along the short side of the case and the end surface buffer members provided between the tank end surfaces at the two ends along the direction in which the intake/outlet pipes extend and the inner surface of the case secure the heat exchanger within the case along the longer side of the case, the heat exchanger can be secured to the case with a high degree of reliability while allowing the expansion/contraction of the heat exchanger and the case to be absorbed effectively.

Moreover, the case should preferably be formed by using a material whose main constituent is aluminum and the pair of tanks and the intake/outlet pipes of the heat exchanger should be formed by using a synthetic resin. It is also desirable to form each of the pair of tanks and the corresponding intake/outlet pipe communicating with the tank at the heat exchanger as an integrated unit by using a synthetic resin material. The use of these materials will improve the corrosion resistance of the intercooler and also facilitate the formation of the heat exchanger.

BRIEF DESCRIPTION OF THE DRAWINGS

In the accompanying drawings, an illustrative embodiment of the invention is shown, from which these and other of its objectives, novel features and advantages will be readily apparent.

DETAILED DESCRIPTION OF THE PREFERRED EMBODIMENT

The following is an explanation of the embodiment of the present invention, given with reference to the drawings.

Figure 1:
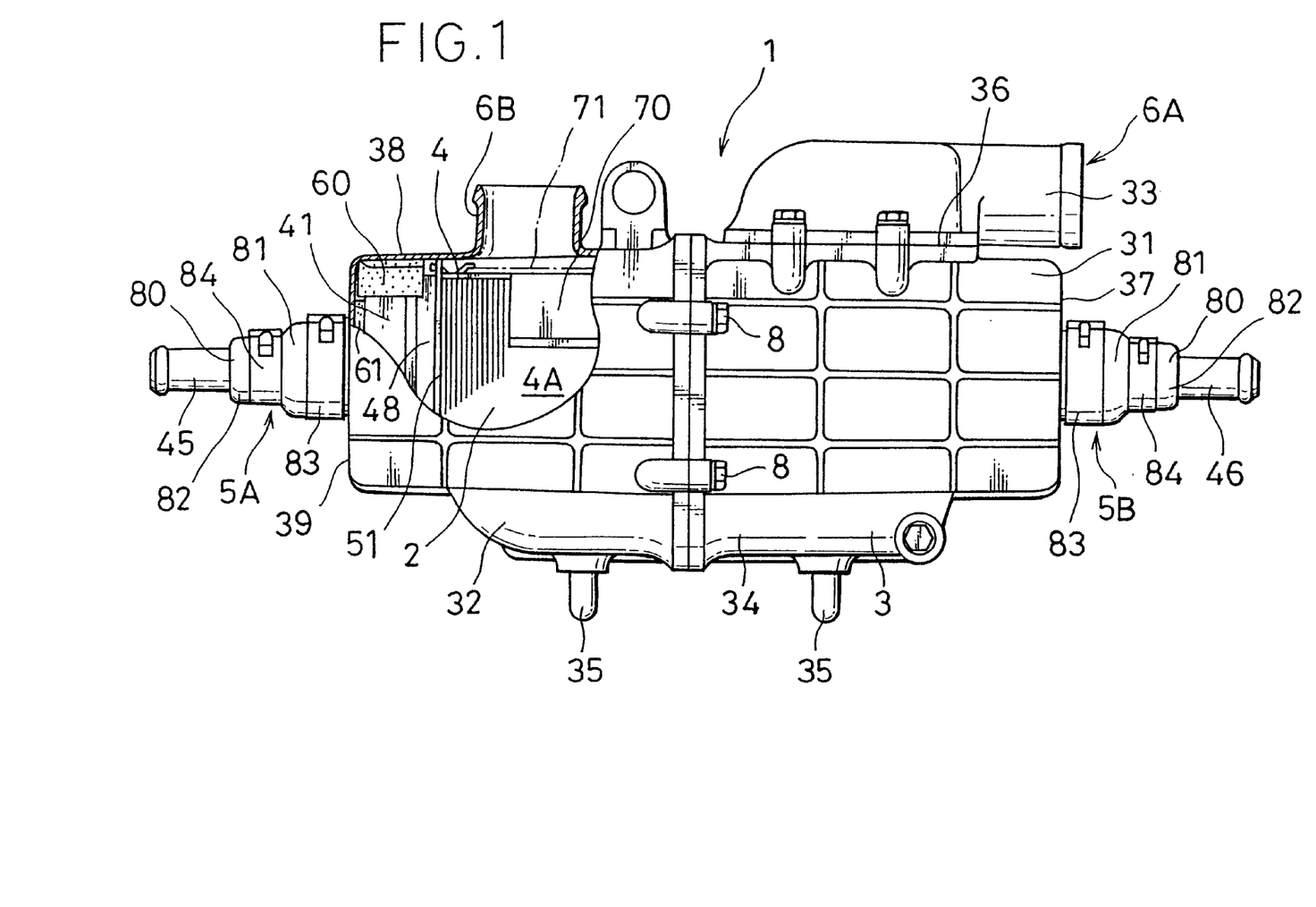
FIG. 1 presents a front view of an intercooler achieved in an embodiment of the present invention.
Figure 2:
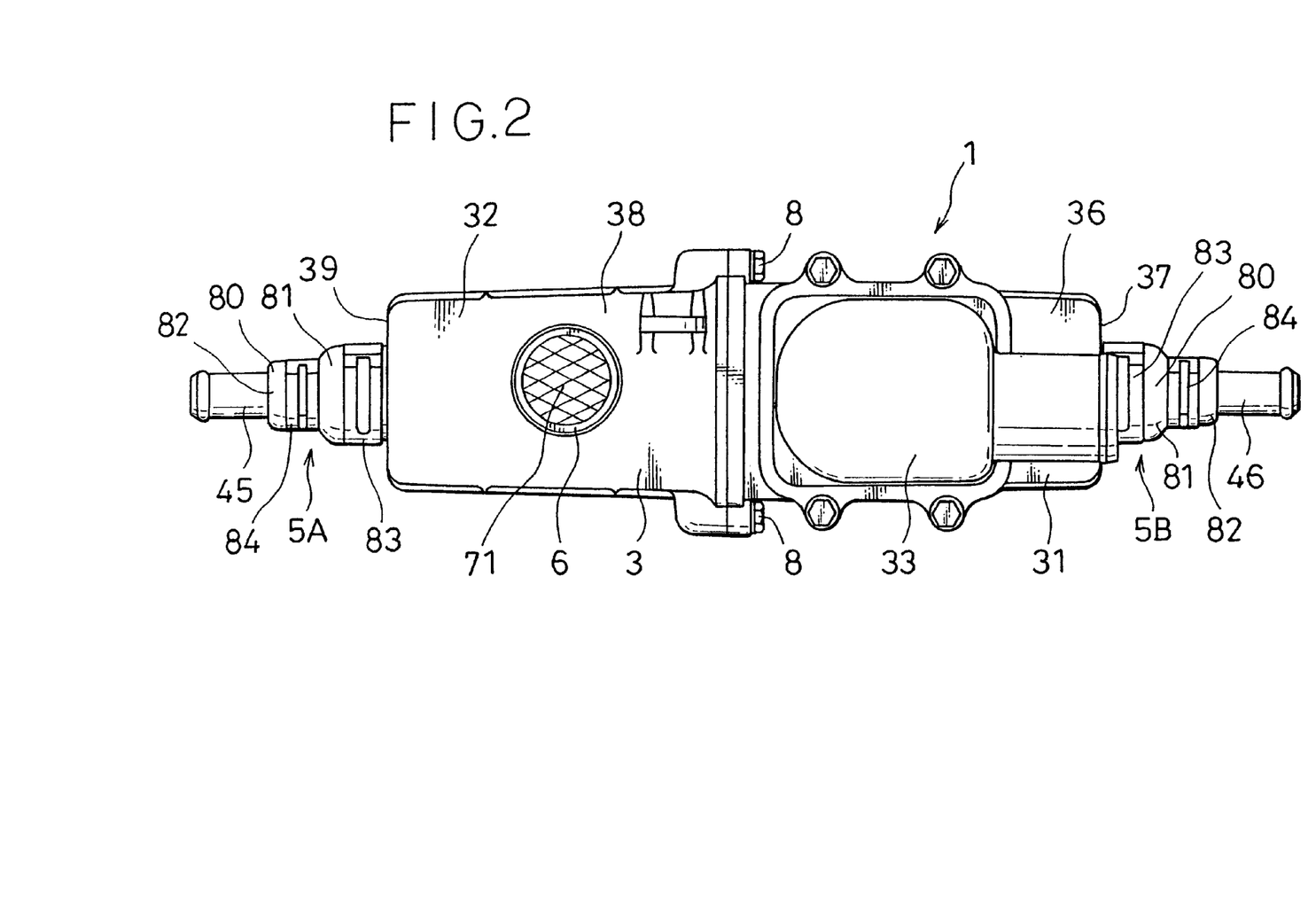
FIG. 2 presents a plan view of the intercooler achieved in the embodiment of the present invention.
Figure 3:
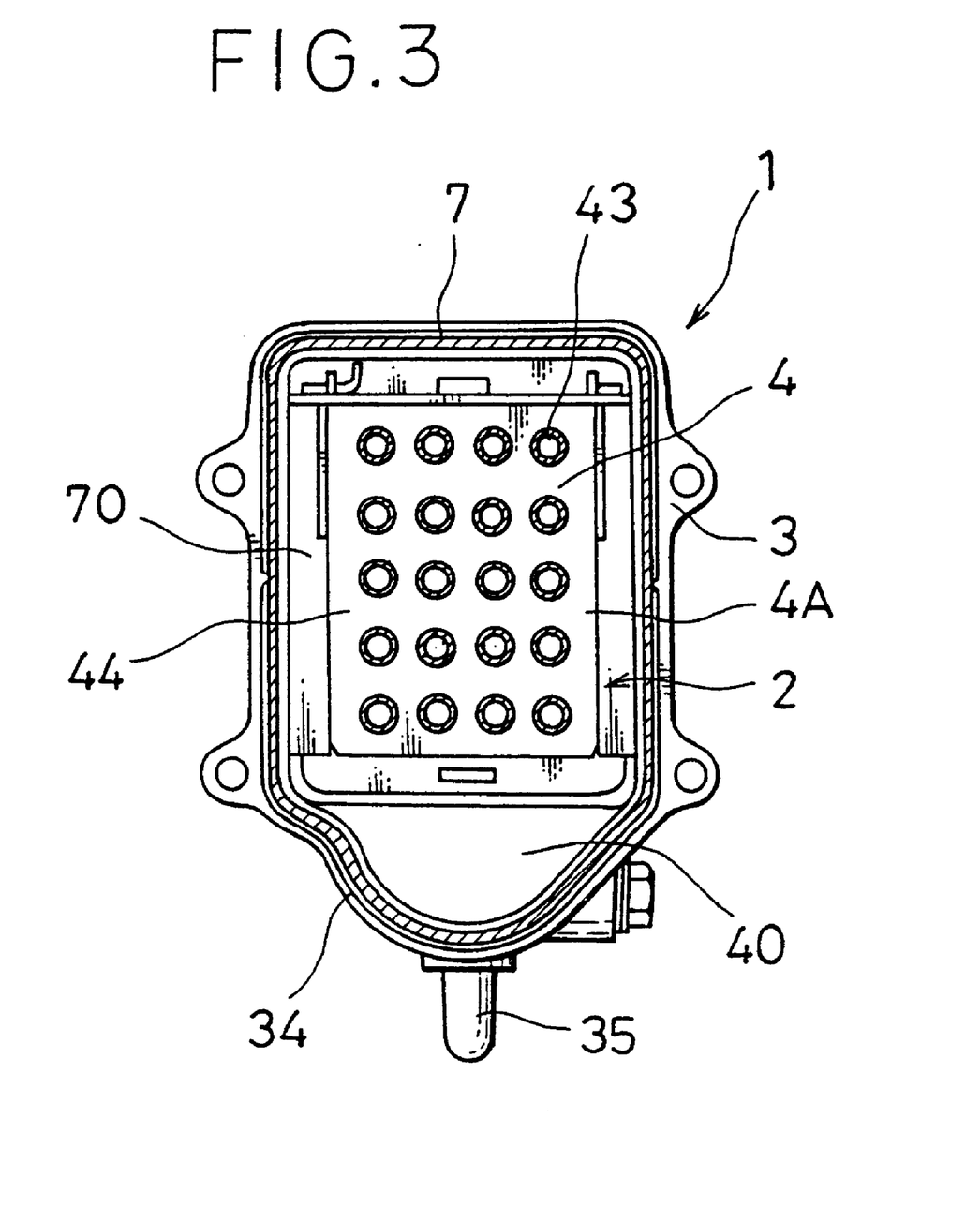
FIG. 3 presents a sectional view of the intercooler achieved in the embodiment of the present invention.

An intercooler 1 shown in FIGS. 1 through 3, which is provided between a supercharger (not shown) that provides supercharging air to a 4-cycle engine mounted in a small planing boat such as a motorboat or a recreational watercraft and the intake side of the engine cylinders, is utilized to improve the air density by lowering the temperature of the supercharging air supplied from the supercharger. The intercooler 1 includes at least a case 3 that defines a cooling space 2 through which the supercharging air passes and a heat exchanger 4 provided in the cooling space 2 inside the case 3. The intercooler 1 in this embodiment uses a fluid mass such as sea water or fresh water, e.g., river water or lake water as the cooling fluid for cooling the supercharging air passing through the case 3.

The case 3 is constituted of an intake-side case 31 and an outlet-side case 32 and, in this embodiment, the case 3 is formed through a die cast manufacturing method using a material such as aluminum, aluminum alloy or the like. At a side surface 36 of the intake-side case 31, which extends along the long side of the case 3, an air intake case 33 that forms a supercharging air intake 6A is securely mounted as a separate member by using bolts. In addition, a cylindrical outlet pipe insertion portion 5B projects out at a side surface 37 at an end surface of the intake-side case 31 located at one of the two ends along the length of the case 3. At the outlet-side case 32, on the other hand, an outlet 6B is formed as an integrated part of a side surface 38 extending along the length of the case 3 and a cylindrical intake pipe insertion portion 5A projects out at a side surface 39 at an end surface of the outlet-side case 32 located at the other end along the length of the case 3.

As described above, the case 3 is formed by linking the intake-side case 31 and the outlet-side case 32 at the center by using bolts 8 via a gasket 7 (see FIG. 3). In addition, a distended portion 34 which forms a U-turn space 40 constituting part of the cooling space 2 is formed at one side surface of the case 3, with retaining rods 35 for securely retaining the intercooler 1 at a specific position projecting at the distended portion 34.

Figure 4:
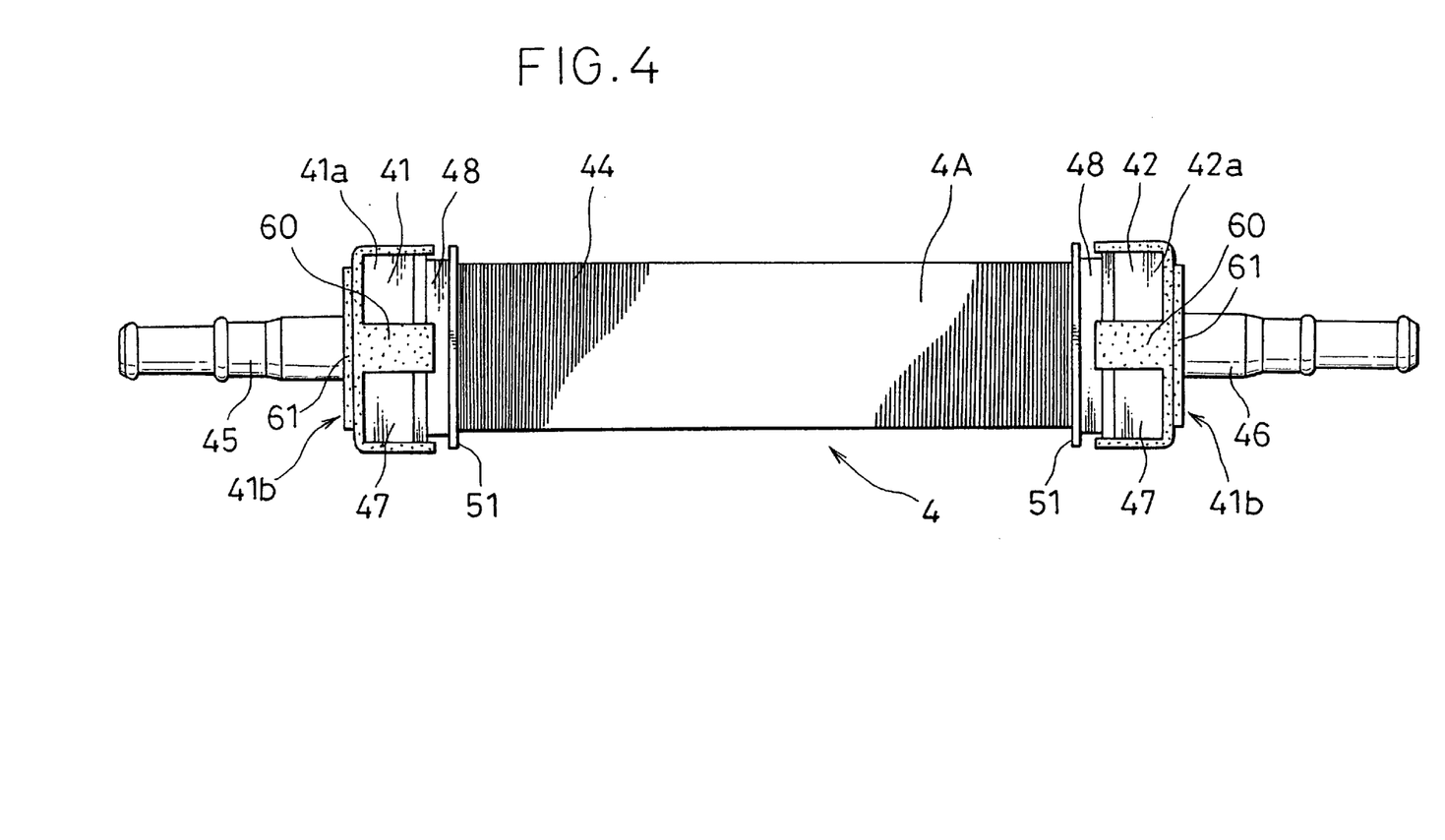
FIG. 4 presents a plan view of a heat exchanger in the intercooler achieved in the embodiment of the present invention.
Figure 5:
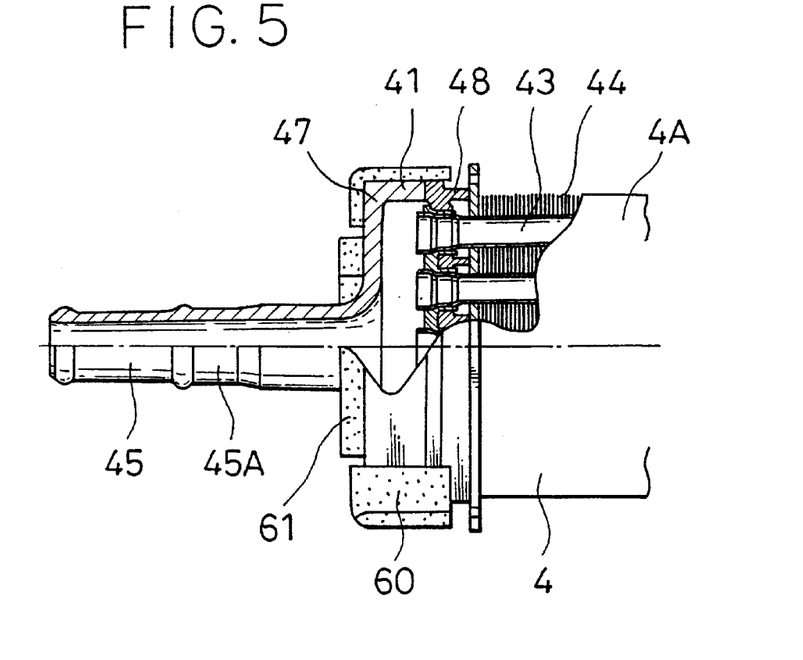
FIG. 5 presents a partial sectional view of the heat exchanger in the intercooler achieved in the embodiment of the present invention.
Figure 6:
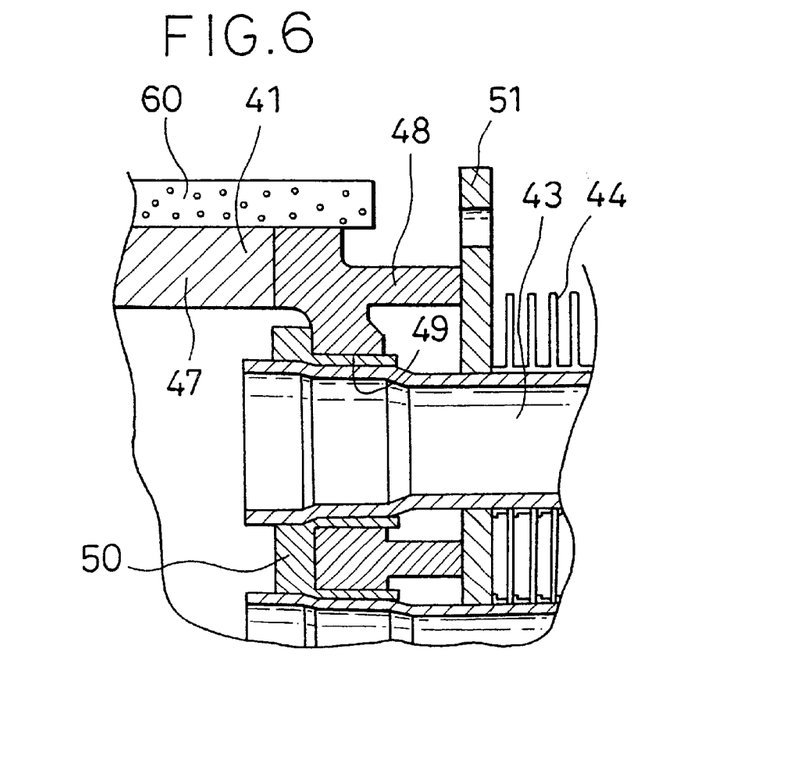
FIG. 6 is an enlarged sectional view of a portion of a tank of the heat exchanger.

The heat exchanger 4 housed inside the case 3 is constituted of a pair of tanks 41 and 42, a plurality of tubes 43 extending between the pair of tanks 41 and 42 and communicating between the pair of tanks 41 and 42, a plurality of plate-like fins 44 through which the plurality of tubes 43 pass, set perpendicular to the tubes 43 along the direction in which the tubes 43 extend over specific intervals along the direction in which the tubes 43 extend, an intake pipe 45 extending to the outside of the heat exchanger 4 from one of the tanks, i.e., the tank 41 along a direction matching the direction in which the tubes 43 extend, and an outlet pipe 46 extending to the outside of the heat exchanger 4 from the other tank 42 along the direction matching the direction in which the tubes 43 extend, as shown in FIGS. 4 through 6, for instance. It is desirable that the fins be constituted of an aluminum alloy with at least either a corrosion resistant resin film or a hydrophilic resin film formed at the surfaces thereof through a surface treatment.

The tank 41 (42) is constituted of a tank main body 47 formed together with the intake pipe 45 (the outlet pipe 46) as an integrated unit by using a synthetic resin or the like and a tube mounting plate 48 that blocks the opening side of the tank main body 47, with the tubes 43 fitted at mounting holes 49 formed at the tube mounting plate 48 via a gasket member 50, as shown in FIGS. 5 and 6. The tubes 43 are formed from a cupro-nickel material (a copper-nickel alloy) or the like having a high degree of corrosion resistance against sea water in the embodiment. In addition, a baffle plate 51 is provided between the tube mounting plate 48 and the fins 44 in order to protect the tank 41 (42) constituted of the synthetic resin from aging. It is desirable that the baffle plate 51 be formed by using an EPDM (ethylene-propylene-dien-monomer) rubber.

Figure 7:
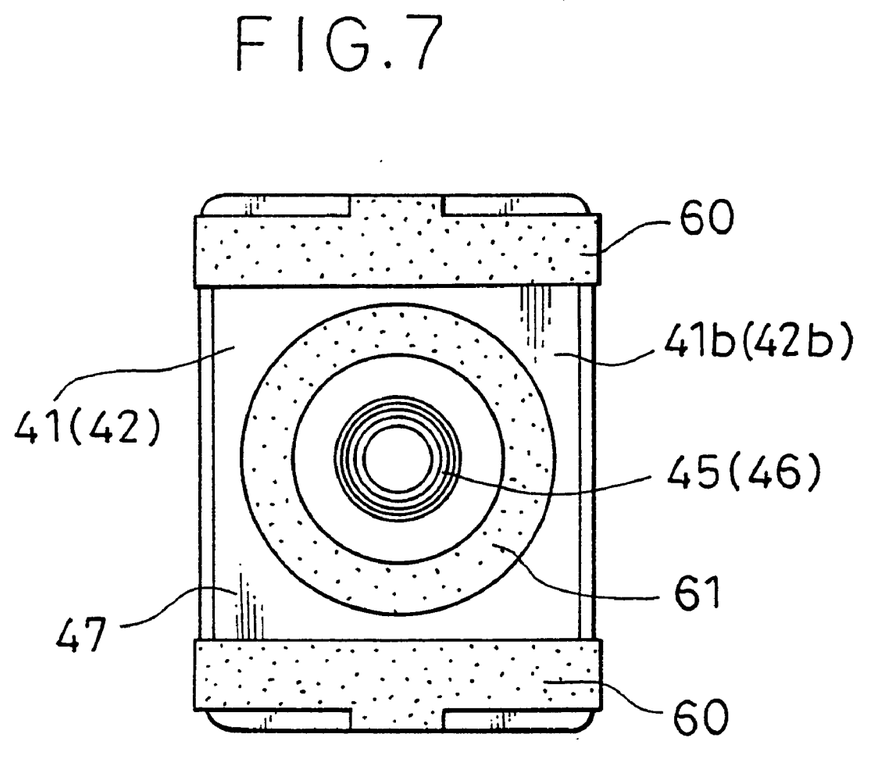
FIG. 7 presents a side elevation of the heat exchanger.

As shown in FIGS. 4, 5 and 7, a side surface buffer member 60 is provided at the circumferential side surface 41a (42a) of the tank 41 (42) so as to prevent vibration of the case 3 from affecting the heat exchanger 4 by avoiding direct contact between the heat exchanger 4 and the case 3 when the heat exchanger 4 is mounted at the case 3. Furthermore, at an end surface 41b (42b) of the tank 41 (42) toward one of the two ends of the heat exchanger 4 along the lengthwise direction, an end surface buffer member 61 is provided to enclose the intake pipe 45 (or the outlet pipe 46), so as to disallow direct contact of the heat exchanger 4 and the case 3 along the length of the heat exchanger 4 and also to absorb the expansion/contraction of the heat exchanger 4 in the case 3 along the lengthwise direction.

In the heat exchanger 4, a frame 70, which divides the cooling space 2 into a side where the intake-side case 31 is present and a side where the outlet-side case 32 is present and blocks off the gap between the heat exchanger 4 and the case 3 is mounted at a heat exchanging unit 4A constituted of the tubes 43 and the fins 44. This allows the supercharging air to travel through the heat exchanging unit 4A with a high degree of reliability, and even if a backfire blows out from the side where the outlet 6B is present, the entry of the backfire is prevented by the fins 44 provided over the specific intervals where the heat is lowered and the backfire is quenched. It is to be noted that a mesh 71 with a specific porosity may be provided at the frame 70 toward the outlet-side case 32, at a position facing opposite the opening of the outlet 6B. In addition, while the frame 70 is provided to block the gap between the heat exchanger 4 and the case 3 in the embodiment, similar advantages may be achieved without the frame 70 by setting the dimensional difference between the external dimensions of the heat exchanger 4 and the internal dimensions of the case 3 equal to or less than a specific value. The specific value may be determined in conformance to the air flow path length, the interval between the individual fins 44 and the like at the heat exchanging unit 4A.

The heat exchanger 4 may be mounted at the case 3 in the intercooler 1 assuming the structure described above by enclosing the heat exchanger 4 with the intake-side case 31 and the outlet-side case 32 from the two sides of the heat exchanger 4, inserting the intake/outlet pipes 45 and 46 through the pipe insertion portions 5A and 5B so as to allow them to extend through the pipe insertion portions 5A and 5B and securing the intake-side case 31 and the outlet-side case 32 to each other with the bolts 8.

Figure 8:
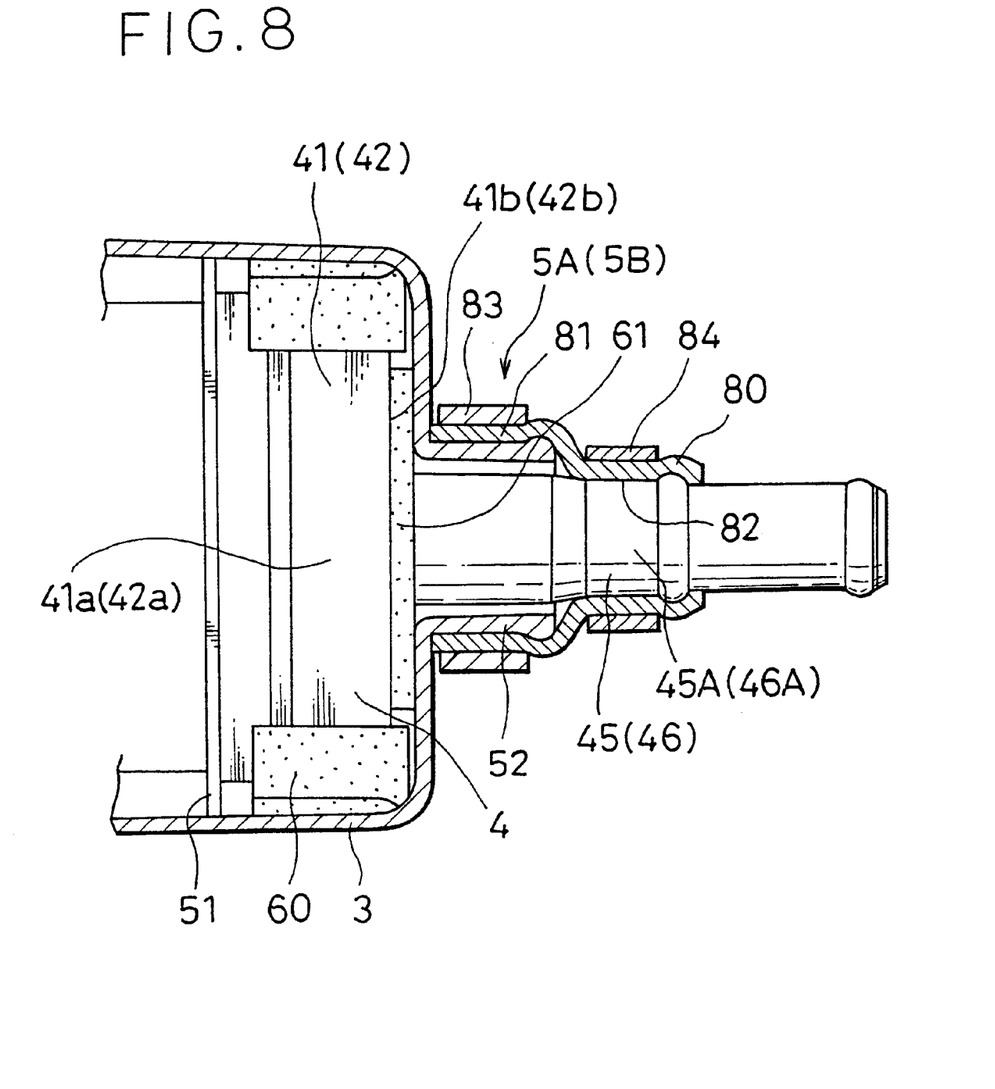
FIG. 8 presents an enlarged sectional view of a portion of the intercooler.

In addition, a seal member 80 is fitted at the pipe insertion portion as shown in FIG. 8 to seal the gap between the intake/outlet pipe 45 (46) of the heat exchanger 4 and the pipe insertion portion 5A (5B). The seal members 80 are each constituted of an elastic material such as rubber, synthetic rubber or synthetic resin formed in a staged cylindrical shape which includes a first cylindrical portion 81 placed in complete contact with a cylindrical projection 52 of the pipe insertion portions 5A (5B) and a second cylindrical portion 82 placed in complete contact with a mounting portion 45A (46A) of the intake pipe 45 (the outlet pipe 46). In addition, the seal members 80 are each firmly secured to the pipe insertion portion 5A (5B) by tightening a clamping member 83 provided at the external circumference of the first cylindrical portion 81 and a clamping member 84 provided at the external circumference of the second cylindrical portion 82.

As a result, sea water, which is utilized as a coolant is allowed to flow in through the intake pipe 45 and to travel through the tubes 44 via the tanks 41 in the heat exchanger 4, and then the sea water is discharged from the tank 42 via the outlet pipe 46. Thus, the temperature at the heat exchanger 4 is controlled in conformance to the temperature of the sea water at all times, i.e., at a temperature within a range of 20° C.~30° C. The supercharging air at 120° C.~130° C. supplied to the 4-cycle engine reaches from the intake 6A to the upstream side of the cooling space 2, travels through the downstream half of the heat exchanging unit 4A of the heat exchanger 4, makes a U-turn at the U-turn space 40, travels through the upstream half of the heat exchanging unit 4A and then is supplied to the cylinders of the engine through the outlet 6B. Since the temperature of the supercharging air is lowered by the heat exchanger 4 and this increases the air density, an improvement in the efficiency of the supercharger is achieved.

In addition, while the heat exchanger 4 and the case 3 expand/contract along the lengthwise direction due to the heat from the supercharging air, any fluctuation occurring in the dimensions due to the expansion/contraction is absorbed at the end surface buffer members 61 and, at the same time, any displacement attributable to the expansion/contraction of the intake/outlet pipes 45 and 46 is absorbed at the seal members 80 constituted of an elastic material. Consequently, any damage that may otherwise occur in the space between the tubes 43 and the tanks 41 and 42 because of the extension/contraction of the heat exchanger is prevented and, at the same time, any damage that may otherwise occur in the space between the intake/outlet pipes 45 and 46 and the case 3 is also prevented.

As explained above, in the intercooler comprising a case through which supercharging air travels and a heat exchanger housed inside the case according to the present invention, the intake/outlet pipes of the heat exchanger are inserted at the cylindrical pipe insertion portions formed at the case and the gaps between the intake/outlet pipes and the insertion portions are sealed by the seal members constituted of an elastic material, each formed in a staged cylindrical shape which includes a first cylindrical portion placed in complete contact with the pipe insertion portion and a second cylindrical portion placed in complete contact with the intake/outlet pipe. Thus, any inconsistency manifesting in the machining/assembly dimensions can be absorbed, thereby achieving reductions in the production cost, the machining cost and the assembly cost.

Furthermore, and since any inconsistency manifesting in the extent of the thermal expansion during the supercharging process does not affect the air density according to the present invention, the service life of the intercooler can be extended.

What is claimed is:

1. An intercooler comprising:
   a heat exchanger constituted of, at least, a pair of tanks, a plurality of tubes communicating between said pair of tanks, a plurality of fins provided over specific intervals along said tubes, and cylindrical intake/outlet pipes each communicating with one of said tanks and extending outward from said tanks; and
   a case defining a cooling space in which said heat exchanger is housed, and through which supercharging air travels, wherein:
   a pair of cylindrical pipe insertion portions each having one of said intake/outlet pipes inserted therein and allowing said intake/outlet pipes to extend to the outside are formed at said case;
   seal members, each constituted of an elastic material formed in a staged cylindrical shape having a first cylindrical portion placed in complete contact with the external circumferential surface of one of said pipe insertion portions and a second cylindrical portion placed in complete contact with the external circumferential surface of one of said intake/outlet pipes are provided at said pipe insertion portions; and
   said seal members seal gaps between said intake/outlet pipes and said pipe insertion portions and fit said heat exchanger inside said case with a gap.

2. An intercooler according to claim 1, wherein:
   said first cylindrical portion and said second cylindrical portion of each of said seal members are respectively secured to one of said pipe insertion portions and one of said intake/outlet pipes with ring clamps.

3. An intercooler according to claim 1, wherein:
   said intake/outlet pipes are each formed to extend to the outside from one of said tanks along the direction in which the axis of said tubes extends and said case can be divided along the axial direction.

4. An intercooler according to claim 1, wherein:

buffer members constituted of an elastic material are provided between said tanks of said heat exchanger and the inner surface of said case.

5. An intercooler according to claim 4, wherein:

said buffer members are each constituted of a side surface buffer member provided between a side surface of one of said tanks and the inner surface of said case and an end surface buffer member provided between an end surface of one of said tanks located at the two ends along the direction in which said intake/outlet pipes extend and the inner surface of said case.

6. An intercooler according to claim 1, wherein:

said case is constituted of a material whose main constituent is aluminum and said pair of tanks and said intake/outlet pipes of said heat exchanger are constituted of a synthetic resin material.

7. An intercooler according to claim 6, wherein:

each of said pair of tanks and the corresponding intake/outlet pipe communicating with said tank in said heat exchanger are formed as an integrated unit with a synthetic resin material.

8. An intercooler according to claim 2, wherein:

said intake/outlet pipes are each formed to extend to the outside from one of said tanks along the direction in which the axis of said tubes extends and said case can be divided along the axial direction.

9. An intercooler according to claim 8, wherein:

buffer members constituted of an elastic material are provided between said tanks of said heat exchanger and the inner surface of said case.

10. An intercooler according to claim 9, wherein:

said buffer members are each constituted of a side surface buffer member provided between a side surface of one of said tanks and the inner surface of said case and an end surface buffer member provided between an end surface of one of said tanks located at the two ends along the direction in which said intake/outlet pipes extend and the inner surface of said case.

11. An intercooler according to claim 10, wherein:

said case is constituted of a material whose main constituent is aluminum and said pair of tanks and said intake/outlet pipes of said heat exchanger are constituted of a synthetic resin material.

12. An intercooler according to claim 11, wherein:

each of said pair of tanks and the corresponding intake/outlet pipe communicating with said tank in said heat exchanger are formed as an integrated unit with a synthetic resin material.

13. An intercooler according to claim 2, wherein:

said case is constituted of a material whose main constituent is aluminum and said pair of tanks and said intake/outlet pipes of said heat exchanger are constituted of a synthetic resin material.

14. An intercooler according to claim 3, wherein:

said case is constituted of a material whose main constituent is aluminum and said pair of tanks and said intake/outlet pipes of said heat exchanger are constituted of a synthetic resin material.

15. An intercooler according to claim 4, wherein:

said case is constituted of a material whose main constituent is aluminum and said pair of tanks and said intake/outlet pipes of said heat exchanger are constituted of a synthetic resin material.

16. An intercooler according to claim 5, wherein:

said case is constituted of a material whose main constituent is aluminum and said pair of tanks and said intake/outlet pipes of said heat exchanger are constituted of a synthetic resin material.

17. An intercooler according to claim 13, wherein:

each of said pair of tanks and the corresponding intake/outlet pipe communicating with said tank and said heat exchanger are formed as an integrated unit with a synthetic resin material.

18. An intercooler according to claim 14, wherein:

each of said pair of tanks and the corresponding intake/outlet pipe communicating with said tank and said heat exchanger are formed as an integrated unit with a synthetic resin material.

19. An intercooler according to claim 15, wherein:

each of said pair of tanks and the corresponding intake/outlet pipe communicating with said tank and said heat exchanger are formed as an integrated unit with a synthetic resin material.

20. An intercooler according to claim 16, wherein:

each of said pair of tanks and the corresponding intake/outlet pipe communicating with said tank and said heat exchanger are formed as an integrated unit with a synthetic resin material.

* * * * *